March 3, 1942. M. HEIM 2,274,692
METHOD FOR MAKING COVERS FOR ELECTRIC DISCHARGE TUBES
Filed Aug. 8, 1940
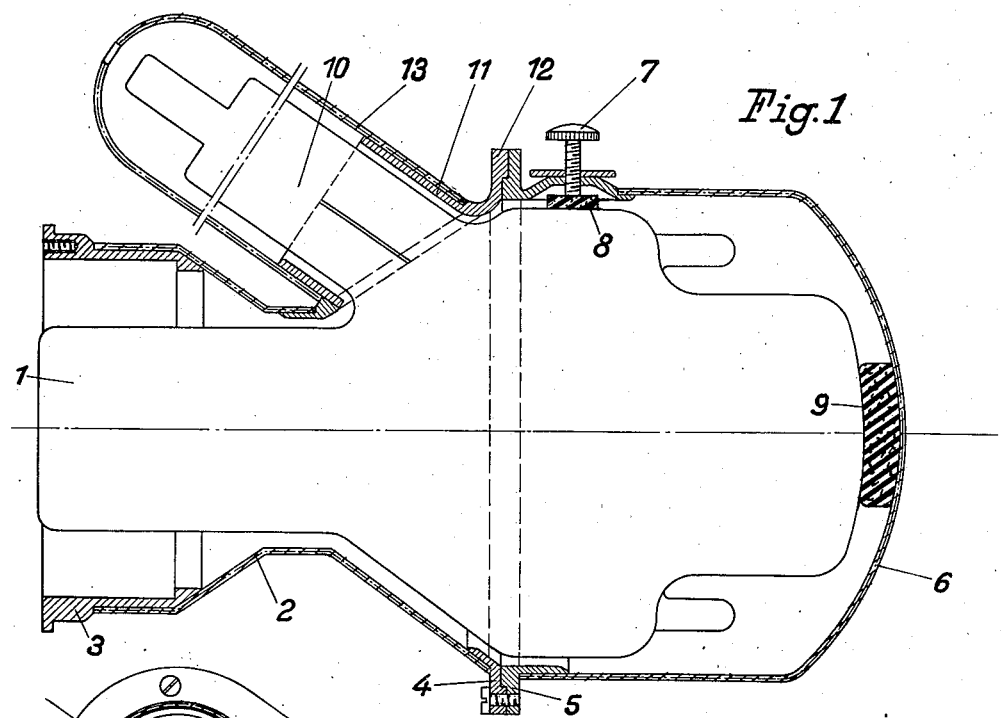
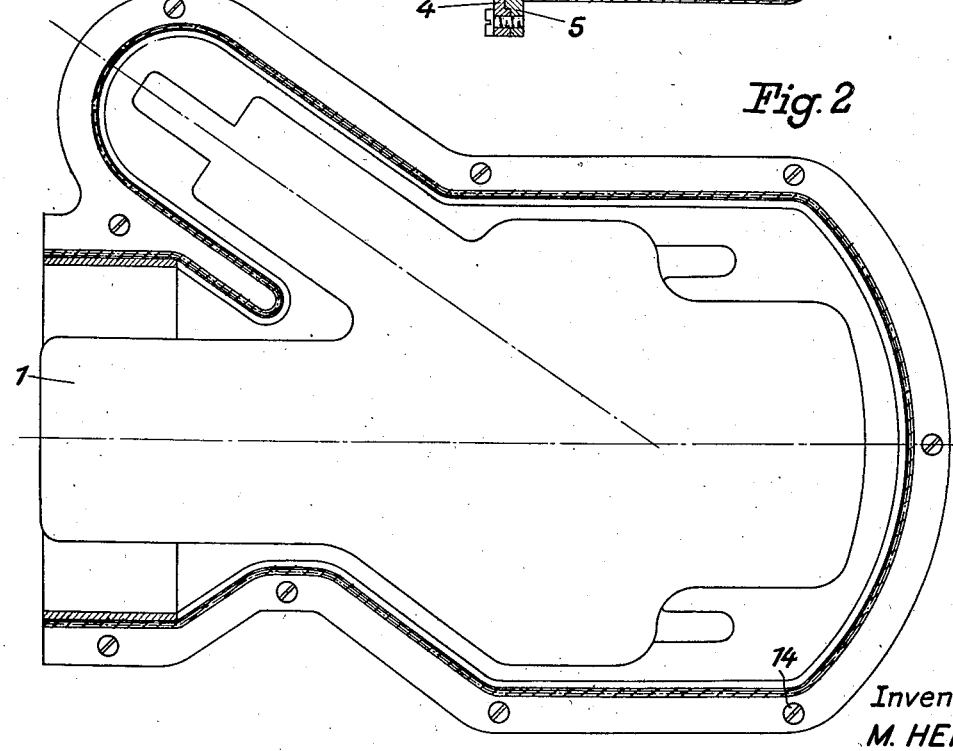
Inventor:
M. HEIM
BY Ch. Sprague
ATTORNEY Patented Mar. 3, 1942

2,274,692

UNITED STATES PATENT OFFICE 2,274,692

METHOD FOR MAKING COVERS FOR ELECTRIC DISCHARGE TUBES

Max Heim, Berlin-Lankwitz, Germany, assignor to Fernseh G. m. b. H., Berlin-Zehlendorf, Germany Application August 8, 1940, Serial No. 351,850
In Germany August 10, 1939

7 Claims. (Cl. 250—27.5)

The invention relates to methods for protecting electron discharge devices particularly television pick-up tubes from the influences of external fields. It refers particularly to methods of making shielding envelopes for such tubes.

It is an object of the invention to avoid the detrimental influence of external electric or magnetic fields upon the electrons of low velocity produced within television pick-up tubes and image tubes in general. It is another object to provide a protective shield or cover for such tubes. It is a further object to manufacture this cover in such a manner that it gives as complete a protection as possible and that it, at the same time, has light weight and requires only small space. It is a particular object to avoid the difficulties which are present when a television pick-up tube of complicated construction is enclosed within a cover of a simple geometrical outline because in this case the cover must be made very large and heavy so that it cannot be incorporated into a movable and handy camera unit.

According to the invention the protective cover follows closely the outline of the pick-up tube envelope consisting, for example, of glass. The cover is made by depositing upon a suitable core the outer surface of which corresponds to the form of the tube alternately a thin layer of ferromagnetic material, as, for example, iron or nickel and an electrically conducting layer, as, for example, copper, aluminum or zinc. The layers are deposited preferably by an electrolytic process or by spraying liquid metal in finely divided form upon the core. Preferably metallic supporting members each covering a plurality of portion of the cover and at least some of which have connecting members in the form of flanges are placed upon the core and the metallic layers are deposited in such a manner that between the supporting members and the layers a durable connection is produced. The cover is preferably made in sections so that the tube can be placed into the cover. The individual sections of the cover are connected with one another, for example, by the metal flanges which have been fastened to the protective layers by the depositing process. The cover has on its outside a layer of metal, for example, nickel, cadmium or chromium resisting atmospheric influences or of a material which is safe against corrosion.

Other aspects of my invention will be apparent or will be specifically pointed out in the description forming a part of this specification, but I do not limit myself to the embodiment of the invention herein described, as various forms may be adopted within the scope of the claims.

Referring to the drawing,

Fig. 1 shows a section through a cover containing a tube envelope and

Fig. 2 is a view of another embodiment of the invention.

In Fig. 1 an image pick-up tube 1 is situated within a cover produced in the above described manner. The cover consists of three sections united into a single structure by means of flanges and screws. The section 2 on the left-hand side of the drawing is connected to a flange 3. The socket of the tube fits into this flange. The section 2 carries furthermore another flange 4. The right-hand section 6 of the cover has a flange 5 which is screwed to the flange 4. The section 6 is provided with three screws 7 arranged on the periphery of the section with a circumferential angle of 120° between the screws. The screws are used for centering the pick-up tube within the cover. The tube is held by resilient pads 8 and 9 consisting, for example, of felt, sponge-rubber or the like. The third section 11 is arranged around the neck 10 of the tube and connected by means of a flange 12 to section 2. The cover portion 13 is connected to member 11 and surrounds the neck of the tube so that the entire tube envelope is enclosed within the protective cover.

Fig. 2 shows another embodiment in which the cover is divided into two sections by a longitudinal plane. The two sections have each a flange of the form represented in Fig. 2 in the plane of the drawing. The flanges are screwed together by means of screws 14.

The cover is made, by way of example, in the following manner: A core of wood is shaped in such a manner that it has substantially an outline of the inner surface of the cover. The core is covered with wax and the supporting members 3, 4, 5 and 11 are placed upon the core. The metallic coatings are then applied by spraying metal in finely divided liquid form upon those portions of the surface which are to be covered by the metal. Alternate layers of copper and of iron are applied until a cover of desired strength is obtained. The parts of the supporting members which are to be left free of the coatings are protected by masks of lacquer or other suitable material from which the metal can be easily removed. After the metal layers are deposited the whole structure is heated so that the wax melts away and the sections can be removed from the core. The sections are then covered completely with a surface protecting layer; for example, they may be chromium-plated in a known process.

The cover follows as closely as possible the form of the tube envelope. The distance between the tube envelope and the cover or between the electrode connections and the cover is prescribed by the potential applied to the connecting leads and the potential of the cover.

In some cases it is preferable to deposit the protective layers, at least partly, directly upon the tube envelope. The places which are not to receive the layer are covered by a mask during the depositing of the layer. In this case it is not necessary to provide flanges for uniting the cover sections but it is useful to provide supporting rings or other supporting members in connection with the cover for fastening the tube.

What I claim is:

1. The method of making a protective cover for an electron discharge tube, including the steps of forming a core having substantially the shape of said tube, placing upon said core a number of metallic supporting and separating members, depositing upon at least a portion of said core and of said supporting and separating members a plurality of metallic layers consisting alternately of a magnetic material and of a non-magnetic material of high electric conductivity so that sections of the protective cover are formed, taking the secttions from said core, and placing them around said tube.

2. The method of making a protective cover for an electron discharge tube including the steps of forming a core having substantially the shape of said tube and consisting at least partly of a material of low melting point, placing upon said core a number of metallic supporting and separating members, spraying upon at least a portion of said core and of said supporting and separating members a plurality of metallic layers consisting alternately of iron and copper so that sections of the protective cover are formed upon the core, removing the sections from said core, and placing them around said tube.

3. The method of making a protective cover for an electron discharge tube, including the steps of forming a core having substantially the shape of said tube, placing upon said core a number of metallic supporting and separating members, depositing upon at least a portion of said core and of said supporting and separating members a plurality of metallic layers consisting alternately of a magnetic material and a material of high electric conductivity, and applying to the surface of the structure so formed a layer of a material substantially unaffected by atmospheric corrosion.

4. The method of making a protective cover for an electrical discharge tube serving also as an electric and magnetic shield therefor which comprises forming a core, a portion of which has about the same shape as the portion of the tube to be protected and is somewhat larger, placing upon said core a material of low melting point, pacing upon said latter material a pair of frame members each having a body portion fitting said core member and a flange portion projecting outwardly therefrom, the flange portions of the members of the pair being placed in contact with each other, spraying upon said core and frame members successive layers of different materials, one of which is magnetic and one non-magnetic and highly electrically conductive and both of which are of a character to harden and become rigid, the material of the lowermost layer being of a character to adhere to the body portions of said members and be non-adherent to said material of low melting point, applying heat to melt said material of low melting point, separating the contacting flange portions of said frame members, and removing said core.

5. The method of making a protective cover for an electrical discharge tube serving also as an electric and magnetic shield therefor which comprises forming a core a portion of which has about the same shape as the portion of the tube to be protected and is somewhat larger, coating said portion of said core with a material of low melting point, placing upon said core a metallic supporting structure which covers a relatively small portion of the core, spraying upon said portion of said core and upon said frame structure successive layers of two different materials, one of which is magnetic and one non-magnetic and highly electrically conducting and both of which are of a character to harden and become rigid, the material of the lowermost layer being of a character to adhere to said supporting structure and be non-adherent to said material of low melting point, said magnetic and non-magnetic materials being applied alternately, and applying heat to melt said material of low melting point to permit said cover to be easily removed from said core.

6. The method of making a protective cover for an electrical discharge tube serving also as an electric and magnetic shield therefor which comprises forming a core, a portion of which has about the same shape as the portion of the tube to be protected and is somewhat larger, placing upon said portion of said core a pair of frame members each having a body portion fitting said core member and a flange portion projecting outwardly therefrom, the flange portions of the members of the pair being placed in contact with each other, applying in succession in liquid form to said core and body portions of said frame members different materials, one of said materials being magnetic and the other non-magnetic and highly electrically conductive, and both of which are of a character to harden and become rigid, the material of the lowermost layer being of a character to adhere to the body portion of said members and to be non-adherent to said core, separating the contacting flange portions of said frame members, and removing said core.

7. The method of making a protective cover for an electrical discharge tube serving also as an electric and magnetic field therefor which comprises forming a core, a portion of which has about the same shape as the portion of the tube to be protected, placing upon said portion of said core a pair of frame members each having a portion fitting said core member and a portion adapted to be secured to another frame member, said frame members being placed in contact with each other, applying in succession in liquid form to said core and frame members different materials, one of said materials being magnetic and the other non-magnetic and highly electrically conductive, and both of which are of a character to harden and become rigid, the material in the lowermost layer being of a character to adhere to the frame members and to be non-adherent to said core, separating said frame members, and removing said core.

MAX HEIM.